(No Model.)

W. H. MELANEY.
HAMMER OR LIKE DIE.

No. 397,929. Patented Feb. 19, 1889.

Witnesses:
J. M. Cooke
Robt. D. Totten

Inventor.
William H. Melaney
By James J. Kay
Attorney

UNITED STATES PATENT OFFICE.

WILLIAM H. MELANEY, OF PITTSBURG, ASSIGNOR OF ONE-HALF TO ROBERT C. TOTTEN, OF ALLEGHENY, PENNSYLVANIA.

HAMMER OR LIKE DIE.

SPECIFICATION forming part of Letters Patent No. 397,929, dated February 19, 1889.

Application filed June 13, 1888. Serial No. 276,963. (No model.)

*To all whom it may concern:*

Be it known that I, WILLIAM H. MELANEY, a resident of Pittsburg, in the county of Allegheny and State of Pennsylvania, have invented a new and useful Improvement in Hammers or Like Dies; and I do hereby declare the following to be a full, clear, and exact description thereof.

My invention relates to anvils, hammers, or like dies, its object being to provide an anvil or hammer or other die which possesses in its body such strength as will enable the body to resist without fracture very severe blows or jars, while at the same time the wearing face or faces are formed of such hard metal as will resist the wearing action of the continued impact or blows upon its surface, so that the life of the anvil, hammer, or like article is greatly extended.

In anvils my improvement also relates to obtaining the greatest strength in the parts thereof subjected to strain—such as in the horn or beak—thereby uniting in a cheap anvil the necessary strength of body, wearing properties in the face, and strength to resist the special strains brought upon the horn or beak.

To these ends my invention consists, generally stated, in an anvil, hammer, or like die having a body of steel and a facing of chilled cast-iron on the wearing-surfaces thereof.

It also consists in an anvil having its body formed of cast-steel, and having a facing of chilled cast-iron on the anvil-face to resist the wear, while the horn or beak of the anvil is formed of forged steel to impart to it the necessary strength for resisting, bending, or like strains.

To enable others skilled in the art to make and use my invention, I will describe the same more fully, referring to the accompanying drawings, in which—

Figure 3:
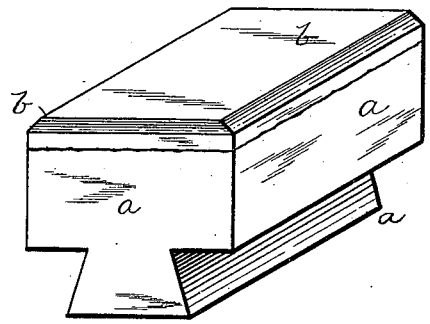
Figure 1:
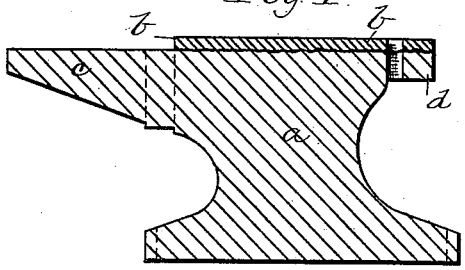
Figure 2:
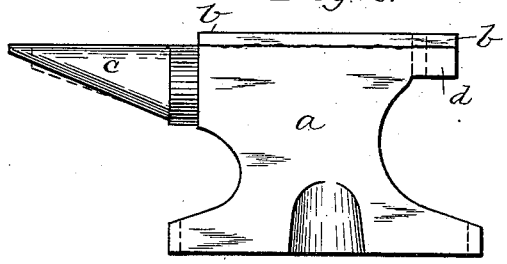
Figure 4:
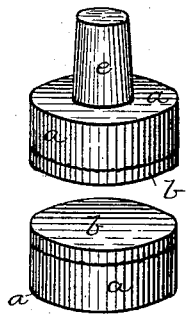

Figure 1 is a sectional view of an anvil embodying my invention before the horn or beak thereof is brought to its finished shape. Fig. 2 is a side view of the finished anvil having the forged steel horn or beak. Fig. 3 is a view of an ordinary hammer-die, and Fig. 4 is a view of an ordinary drop or stamping die.

Like letters of reference indicate like parts in each.

Where my invention is applied to anvils such as shown in Figs. 1 and 2 the body $a$ of the anvil is formed of cast-steel, the horn $c$ is formed of the same material, while the facing $b$ on the anvil is formed of chilled cast-iron, the chilled cast-iron being united to the body $a$ of the anvil by fusion, so as to form an intimate and perfect union therewith. The body $a$ extends under the rear end of the chilled face, as at $d$, so giving a support to the entire chilled facing, and this body $a$ is formed of homogeneous or low-grade steel, which has all the strength and toughness necessary to sustain the jar or blows brought upon the chilled surface of the anvil, while the chilled cast-iron of the facing $b$ is so hard that it will withstand, without appreciable wear, the blows brought upon it in the forging and like operations generally carried on on the surface of the anvil. As the facing $b$ is united to the steel body $a$ by fusion, it is perfectly supported thereby, and consequently there is no liability whatever of the chilled facing being loosened or separated from the body $a$ by the blows of the hammer or other such means. In practice I generally form the body $a$ of low-grade steel, and under that term I include a steel or iron as low or free from carbon as can be cast in a mold, the body $a$ and horn $c$ being formed of this steel, while the chilled facing $b$ is composed of chilled cast-iron, and is generally one inch or one and one-fourth inch in thickness. The horn or beak $c$ of the anvil is formed integral with the body $a$ thereof, and, as it is composed of homogeneous or low-grade steel, this horn can after the casting be reheated and forged to shape, the shape of the horn when cast being shown in Fig. 1, while in Fig. 2 is shown the forged and finished horn, which has been reheated and drawn out under the hammer, so compacting it and adding greatly to the strength (tensile, torsional, and transverse) of this part of the anvil, which is subjected to heavy strains and is liable to be broken.

In Fig. 3 is shown an ordinary hammer-die which is adapted to be secured either to the base of the anvil or to the reciprocating head of the steam or other like hammer. This hammer-die has the body $a$ of steel and the facing $b$ of chilled cast-iron, the metals employed in the hammer-die being substantially such as described in connection with the anvils shown in Figs. 1 and 2.

In Fig. 4 are shown stamping-dies such as used in stamping or crushing mills, the bodies $a$ of said dies being formed of steel and the facings $b$ thereof being formed of chilled cast-iron, while either die has or both dies have the shank $e$, by which the die is secured in place in the stamping-mill or drop-hammer. These stamping-dies have heretofore been formed of chilled cast-iron, in order to provide a sufficiently-hard surface to withstand the very severe wear brought upon their faces, and great loss has been occasioned on account of the breaking of the dies, because of the brittle nature of the metal from which they have been formed. Where, however, only the facings of these dies are formed of chilled cast-iron, the facings are supported by the tough steel bodies of the dies, to which they are united by fusion. On account of the intimate union between the facings and the steel bodies it is evident that the dies are able to withstand much more severe blows, and it is evident that their wearing quality can be largely extended.

In forming my improved anvil, hammer, or other die, I employ any suitable mold for the purpose having therein a mold-chill with which the molten chilling cast-iron comes in contact, in most cases the chill being placed in the bottom of the mold, though, if desired for any particular reason, it may be placed either in the sides or top thereof, and the chilling cast-iron is first run into the mold, when, as it comes in contact with the mold-chill therein, that portion thereof in contact with the mold-chill becomes chilled or rapidly congealed, so forming the chilled or hardened facing thereon, and immediately after the cast-iron is run into the mold the steel is poured therein, and this steel entering the mold comes in contact with the entire surface of the chilled facing formed in the mold and unites therewith by fusion, the molten steel, on account of its greater specific gravity, floating or discharging from the mold any molten or unchilled cast-iron therein, so that there is a perfect contact and intimate union between the chilled shell and molten steel forming the body of the anvil or hammer-die.

In hammer-dies such as shown in Fig. 3, or stamping-dies such as shown in Fig. 4, the dies are practically finished in the casting operation, it only being necessary in some cases to grind or plane the surface of the dies. In the manufacture of anvils, however, in order to obtain the necessary strength and thickness in the horn or beak of the anvil, this part of the anvil is heated in a suitable forge and is then forged out, being drawn under a hammer to the desired shape, and a perfect surface formed thereon, while the metal is so compacted and strengthened as to make this part of the anvil, which has generally been considered the weakest part, sufficiently strong to withstand all ordinary strains. The working-face $b$, formed of chilled cast-iron, may then be ground or planed, as desired, so finishing the anvil.

By my invention I am thus enabled to provide anvils, hammer-dies, &c., which, while having the hard surface adapted to withstand the wear which is obtained by the chilled cast-iron, have also the necessary toughness and strength of body, so that there is practically no liability of breaking or crushing of the anvil or die, and the chilled facing is properly supported by the tough and strong metal forming the body of the article. In anvils I am also enabled to obtain an anvil having superior qualities at a practically low cost, as in order to obtain the desired strength within the anvil it has been generally considered necessary to forge the anvil from wrought metal and weld a steel face thereon, this being a costly and laborious operation; and in my improved anvil I obtain without the labor of forging the entire article or welding the facing thereon an anvil having a tough and strong body and stiffened finished horn and a facing which is much harder and better suited to resist wear than is obtained in anvils of other manufactures, as above referred to.

What I claim as my invention, and desire to secure by Letters Patent, is—

1. As a new article of manufacture, an anvil, hammer, or like die having a body of cast-steel and a facing of chilled cast-iron united thereto, substantially as and for the purposes set forth.

2. As a new article of manufacture, an anvil having its body and horn formed of cast-steel and a facing of chilled cast-iron on the face of the anvil united to the body, substantially as and for the purposes set forth.

3. As a new article of manufacture, the anvil having its body formed of cast-steel and a facing of chilled cast-iron on the face thereof united to the body, and a horn or beak formed of forged steel, substantially as and for the purposes set forth.

In testimony whereof I, the said WILLIAM H. MELANEY, have hereunto set my hand.

WILLIAM H. MELANEY.

Witnesses:
J. N. COOKE,
ROBT. D. TOTTEN.